United States Patent

[11] 3,613,534

| [72] | Inventors | Mutsunobu Yazaki<br>Yokohama-shi;<br>Takashi Uchiyama, Tokyo, both of Japan |
|---|---|---|
| [21] | Appl. No. | 820,901 |
| [22] | Filed | May 1, 1969 |
| [45] | Patented | Oct. 19, 1971 |
| [73] | Assignee | Canon Kabushiki Kaisha<br>Tokyo, Japan |
| [32] | Priority | May 9, 1968 |
| [33] | | Japan |
| [31] | | 43/38016 |

[54] FLASH GUIDE NUMBER SETTING DEVICE FOR CAMERA
4 Claims, 2 Drawing Figs.

[52] U.S. Cl. .................................................. 95/10 C, 95/64 A
[51] Int. Cl. ........................................................ G03b 7/16
[50] Field of Search .......................................... 95/10 C, 64 A, 64

[56] References Cited
UNITED STATES PATENTS

| 3,072,028 | 1/1963 | Lange .......................... | 95/10 C |
| 3,073,221 | 1/1963 | Takahama ..................... | 95/10 C |
| 3,085,486 | 4/1963 | Bushman et al. .............. | 95/64 |
| 3,283,681 | 11/1966 | Singer et al. .................. | 95/10 C |
| 3,344,724 | 10/1967 | Taguchi ........................ | 95/10 C |
| 3,406,619 | 10/1968 | Rentchler ..................... | 95/10 C |
| 3,470,805 | 10/1969 | Suzuici et al ................. | 95/10 C X |

Primary Examiner—Joseph F. Peters, Jr.
Attorney—Watson, Leavenworth and Kelton

ABSTRACT: A guide number setting device wherein a guide number for a predetermined film sensitivity may be set by a guide number setting ring irrespective of the sensitivity of the film being used when flash photography is made by utilizing an exposure control mechanism of a camera having a built-in exposure meter.

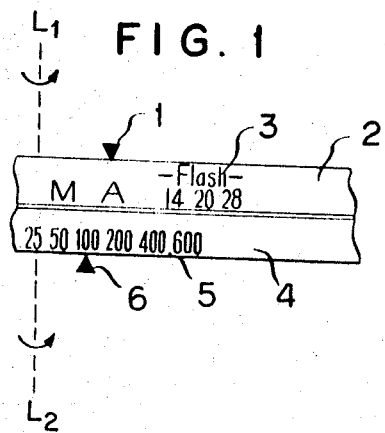
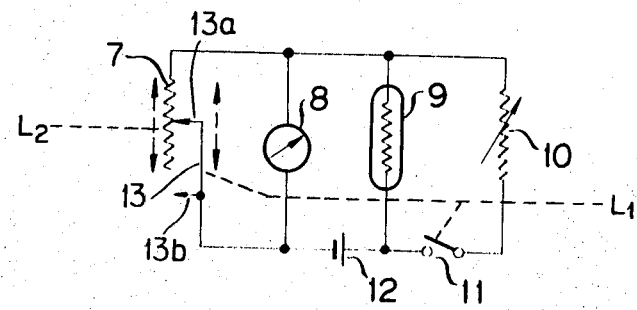

FLASH GUIDE NUMBER SETTING DEVICE FOR CAMERA

The present invention relates to a guide number setting device for flash photography by a camera having a built-in exposure meter by utilizing its exposure control mechanism.

Generally, a guide number of a flashbulb or "speed-light" is indicated by a number only for ASA 100. Therefore, it is very inconvenient when a film having a sensitivity other than ASA 100 is used because a guide number for this film must be obtained by a conversion table or the like and set by a guide number setting ring of the camera.

In view of the above, the present invention provides a guide number setting device for cameras wherein a guide number for ASA 100 may be always set irrespective of the sensitivity of film being used in case of flash photography and the sensitivity of the film may be set by a separate ASA or film sensitivity setting ring. The device of the present invention remarkably facilitates the operation of the cameras.

The above and other objects, features and advantages of the present invention will become more apparent from the following description taken in conjunction with the accompanying drawing, in which:

FIG. 1 is a schematic view showing portions of a guide number setting dial and a film sensitivity setting ring according to the present invention; and FIG. 2 is a diagram showing the exposure meter circuit of the device of the present invention.

FIG. 1 is a schematic view showing one portion of a guide number setting dial according to the present invention. Reference numeral 1 denotes a fixed Auto-Flash indicating index, 2 is an Auto-Flash switching ring, 3 is guide number graduated scales formed upon the ring 2, 4 is a film sensitivity setting ring, 5 is ASA sensitivity marks provided on the ring 4, and 6 is an ASA sensitivity index.

FIG. 2 is a diagram of an exposure meter circuit of the device of the present invention in which reference numeral 7 designates a variable resistor for setting film sensitivity or guide number, 8 is an ammeter, 9 is a photoconductor element, 10 is another variable resistor for distance setting, 11 is a switch, and 12 is a battery.

The sliding arm 13 of the variable resistor 7 shown in FIG. 2 is displaced in accordance with movement of Auto-Flash switching ring 2, as indicated schematically by linkage $L_1$. Arm 13 includes of two integrally formed movable contacts arranged in such a manner that single and different contacts will contact the resistor element when the Auto-Flash switching ring 2 shown in FIG. 1 is set to Auto(A)- and Flash-photographing positions, respectively. On the other hand, the resistor element of the variable resistor 7 is adapted to be rotated when the film sensitivity setting ring 4 is rotated, as indicated schematically by linkage $L_2$.

The mode of operation of the device of the present invention will be described hereinafter. In case of the automatic photoelectric exposure control photography (EE photography), the ASA sensitivity of the film to be used is set to the ASA sensitivity index 6 by the film sensitivity setting ring 4 and the Auto-Flash switching ring is set to A (Auto) position so that contact 13a contacts the resistor element and the switch 11 in the exposure meter circuit is opened, i.e., in accordance with the position of contact 13a thereby setting the camera for the ordinary EE photographing with the exposure meter circuit being established by the photoconductor element 9, the ammeter 8 and the battery 12. That is, the angle of deflection of the pointer of the ammeter is determined by the intensity of light incident upon the photoconductor element. The sensitivity of the ammeter is determined by the resistance of the variable resistor 7 interlocked with the ASA ring.

In case of the flash photography, a guide number of a flashbulb for ASA 100 is set to the index 1 by rotating the Auto-Flash switching ring. As this ring is moved from its above Auto (A) position, switch 11 is closed and contact 13b contacts resistor 7. Next the ASA sensitivity of the film being used is set to the index 6 by rotating the film sensitivity setting ring 4. Thus, the resistance value of the variable resistor 7 is determined in accordance with the ASA sensitivity of the film being used and the guide number for ASA 100. In this case, the switch 11 is closed so that the distance setting variable resistor 10 is connected with the exposure meter circuit. Therefore, the exposure is automatically indicated by the pointer of the ammeter by focusing an object to be photographed through the distance scale ring. The photoconductor element remains connected in the circuit even in case of the flash photography, but it will not adversely affect the accurate indication of the ammeter because the resistance of the photoconductor is very high when directed toward a dark object.

According to the guide number setting device according to the present invention, the camera may be easily set to the flash photography from the auto photography by setting a guide number of a flashbulb for ASA 100 by the guide number ring and setting the sensitivity of the film to be used by the ASA setting ring which is separately provided so that the erroneous operation can be positively prevented. Furthermore, the variable resistor 7 in the exposure meter circuit has two movable contacts as described above, it may be utilized in both of the guide number and film sensitivity settings so that the device of the present invention is rendered advantageously simple in construction.

What is claimed is:

1. In a camera having an exposure control circuit adapted for controlling camera exposure including in series a photoconductor, a battery and an ammeter, a guide number setting device comprising: said control circuit; a first variable resistor operatively responsive to the camera distance setting ring and connected in parallel with said photoconductor element; and a second variable resistor connected in parallel with said ammeter, said second variable resistor comprising a resistor element movable in accordance with rotation of the camera film sensitivity ring and resistor element contact means movable in accordance with rotation of the camera Auto-Flash switching ring, said Auto-Flash switching ring bearing guide number indications corresponding to predetermined camera film sensitivities, said contact means continuously engaging said resistor element throughout rotation of both said film sensitivity ring and said Auto-Flash switching ring.

2. The guide number setting device claimed in claim 1 wherein said contact means comprises two commonly movable spaced contacts selectively engaging said resistor element in accordance with predetermined rotation of said Auto-Flash ring.

3. Apparatus for controlling camera shutter exposure in both flash photography and autophotography comprising:
   a. a photoconductor;
   b. a first variable resistance controlled in accordance with camera focusing;
   c. switch means connecting said first variable resistor in parallel with said photoconductor;
   d. a circuit connected in parallel with said photoconductor and including in series an ammeter controlling said shutter exposure and a battery; and
   e. a second variable resistance connected in parallel with said ammeter and having a movable resistor element and contact means movable relative to said resistance element, said resistor element movement controlled in accordance with film sensitivity, said contact means movement controlled in accordance with guide number in flash photography, said contact means being movable to a predetermined position in autophotography, said switch means being rendered nonconductive exclusively upon movement of said contact means to said predetermined position.

4. The apparatus claimed in claim 3 wherein said contact means comprises two commonly movable spaced contacts, one of said contacts engaging said resistor element in autophotography and the other of said contacts engaging said resistor element in flash photography.

UNITED STATES PATENT OFFICE
CERTIFICATE OF CORRECTION

Patent No. 3,613,534　　　　　　　　　Dated October 19, 1971

Inventor(s) Mutsunobu Yazaki and Takashi Uchiyama

It is certified that error appears in the above-identified patent and that said Letters Patent are hereby corrected as shown below:

Item [56], Title page, "Rentchler" should read --Rentschler--.

Item [56], Title page, "Suzuici et al" should read --Suzuki et al--.

Item [56], Title page, should include --3,392,643; 7/1968; Rentschler; 95/10C-- and --3,461,783; 8/1969; Fujii; 95/10C--.

Column 1, line 44, delete "of".

Column 1, line 44, after "contacts" insert --13a and 13b--.

Column 1, lines 60-61 delete "i.e., in accordance with the position of contact 13a" and insert --as indicated schematically by linkage $L_1$ in Fig. 2,--.

Column 1, line 68 after "ring" insert --,i.e., in accordance with the position of contact 13a--.

Signed and sealed this 21st day of May 1974.

(SEAL)
Attest:

EDWARD M. FLETCHER, JR.　　　　　　　C. MARSHALL DANN
Attesting Officer　　　　　　　　　　Commissioner of Patents

FORM PO-1050 (10-69)